Dec. 10, 1963 L. MAGAZANIK 3,114,015
COMBINATION TURN AND EMERGENCY STOP SIGNAL APPARATUS
Filed April 11, 1960 2 Sheets-Sheet 2
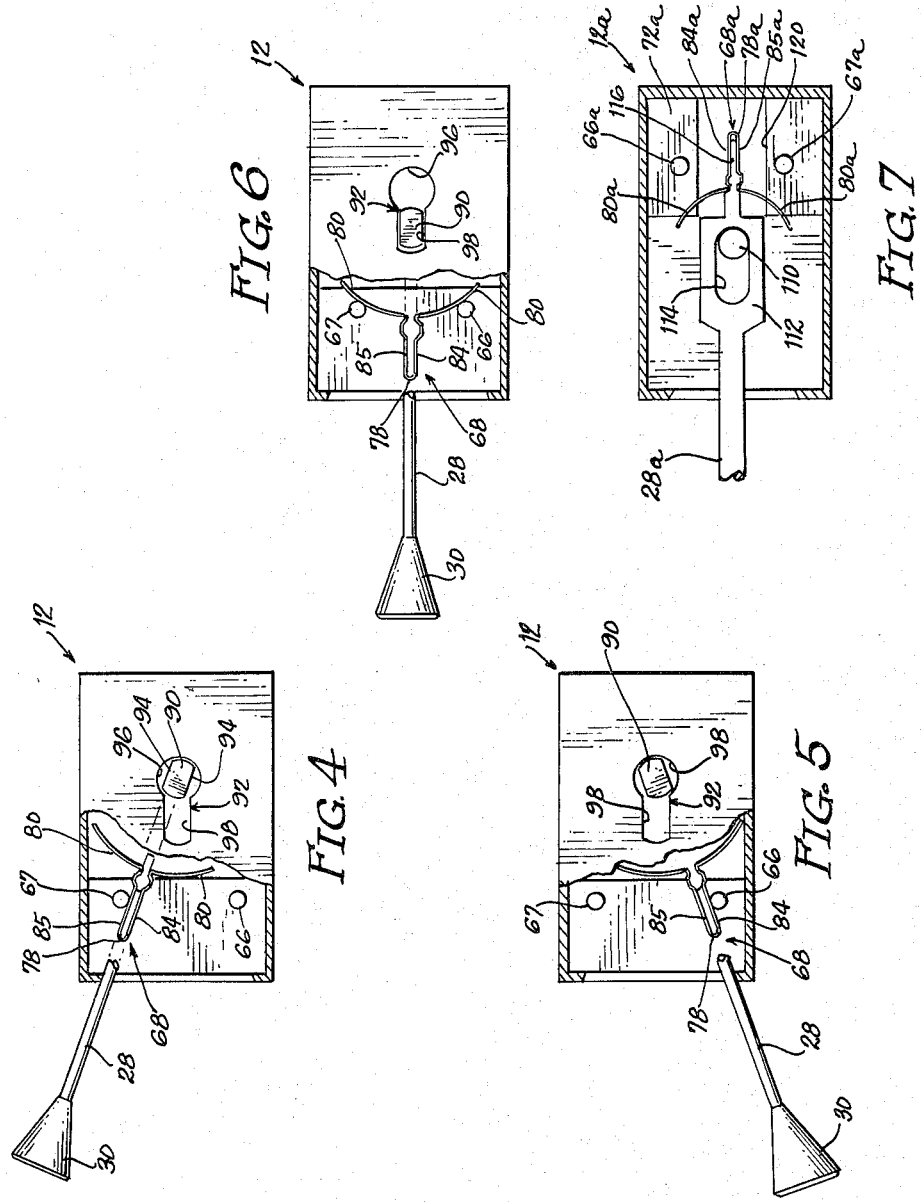
INVENTOR.
Louis Magazanik
BY
Ooms, McDougall, Williams & Hersh
Attorneys

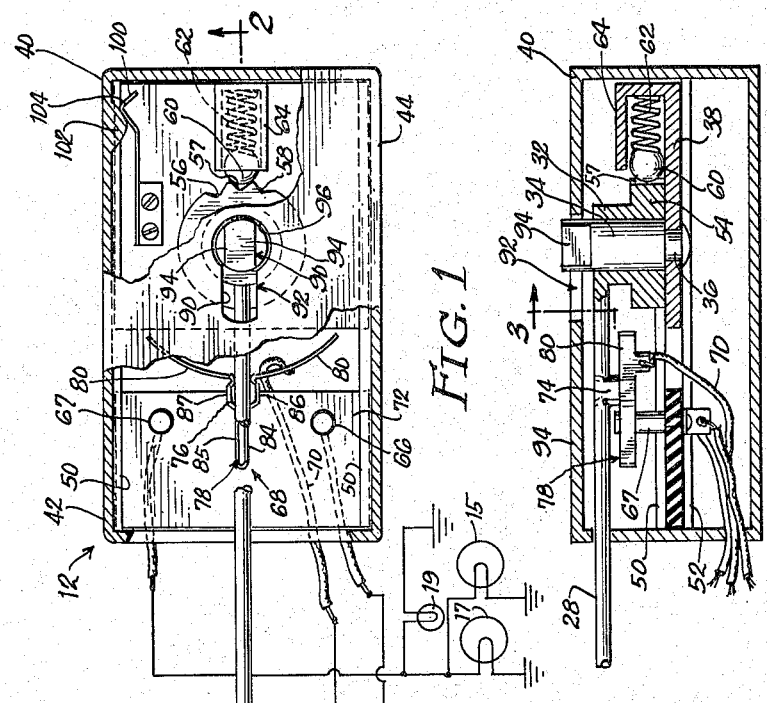

United States Patent Office 3,114,015
Patented Dec. 10, 1963

3,114,015
COMBINATION TURN AND EMERGENCY STOP
SIGNAL APPARATUS
Louis Magazanik, 3507 Church St., Skokie, Ill.
Filed Apr. 11, 1960, Ser. No. 21,417
5 Claims. (Cl. 200—61.27)

This invention relates to signal systems for automobiles, trucks, and other vehicles, and pertains particularly to a combination turn and emergency stop signal system. In systems of this type, left and right-hand directional signal lamps are provided on the vehicle. In the usual arrangement, there are two sets of these lamps, one set of red lamps visible from the rear of the vehicle and one set of white lamps visible from the front. To signal a left turn, the lamps on the left side of the vehicle are illuminated. Similarly, a right turn is signalled by illuminating the lamps on the right side of the vehicle. In the usual arrangement a flasher is employed so that the lamps will blink on and off. To signal an emergency stop, all of the signal lamps are illuminated on both sides of the vehicle, and all of the lamps are flashed. The emergency stop signal is employed when the vehicle has been brought to a stop on the open highway or in some other exposed position, particularly at night, so that drivers of approaching vehicles may be able to see the stopped vehicle and know immediately that it has been stopped. The use of such emergency stop signals does much to prevent accidents in which a stopped vehicle is struck by an approaching vehicle at night, due to the inability of the driver of the approaching vehicle to see the stopped vehicle in time to avoid it.

One object of the present invention is to provide a new and improved signal system of the foregoing character, in which a single lever is employed to actuate the emergency stop signal as well as the turn signals, the lever being swung clockwise to signal a right turn, and counterclockwise to signal a left turn, and being displaced along its longitudinal axis to actuate the emergency stop signals.

A further object is to provide a new and improved arrangement of the foregoing character in which the lever is prevented from being swung in either direction from its neutral position when the lever has been displaced longitudinally to actuate the emergency stop signal.

Another object is to provide a new and improved arrangement of the foregoing character which is extremely convenient and durable, yet which is easy to manufacture and low in cost.

Further objects and advantages of the present invention will appear from the following description, taken with the accompanying drawings, in which:

FIG. 1 is a partly diagrammatic elevational view of a combined turn and emergency stop signal arrangement to be described as an illustrative embodiment of the present invention, certain parts of the control switch for the signals being broken away for clarity of illustration.

FIG. 2 is a longitudinal section, taken generally along a line 2—2 in FIG. 1.

FIG. 3 is an end view, partly in section along the broken line 3—3 in FIG. 2.

FIG. 4 is a small-scale elevational view, somewhat similar to FIG. 1, but showing the control switch in its right turn signal position.

FIG. 5 is an elevational view similar to FIG. 4, but showing the turn signal switch in its left turn signal position.

FIG. 6 is a view similar to FIG. 4, but showing the control switch in its emergency stop signal position.

FIG. 7 is a view similar to FIG. 1, but illustrating a modified construction.

As already indicated, FIG. 1 illustrates a combination turn and emergency stop signal system 10 for use on a truck, automobile or other vehicle. The illustrated system 10 comprises a switch 12 adapted to control the operation of signal lamps 14, 15, 16 and 17. The lamps 14 and 15 may be visible from the rear of the vehicle and may be equipped with red lenses so as to be red in color. The lamps 16 and 17 may be visible from the front of the vehicle and may be white in color. In this case, the lamps 14 and 16 are on the left side of the vehicle, while the lamps 15 and 17 are on the right side. It will be seen that the lamp 16 is connected in parallel with the lamp 14 while the lamp 17 is connected in parallel with the lamp 15. A pilot lamp 18, visible to the driver, may be connected in parallel with the lamps 14 and 16. Similarly, a pilot lamp 19 may be connected in parallel with the lamps 15 and 17.

The signal system may receive its electrical power from a battery 20 or any other suitable source. An on-off switch 22 and a flasher 24 may be connected in series between the battery and the control switch 12. The switch 22 may be the ignition switch of the vehicle or may be combined with the ignition switch. The flasher 24 may be of any known or suitable construction and may be arranged to make and break the circuit in a cyclical manner so that the control lamps will blink on and off when they are actuated by the control switch 12.

The control switch 12 is provided with an operating lever 28. A handle or a grip 30 is mounted on the outer end of the lever 28. When the lever 28 is swung in a clockwise direction, the lamps 15 and 17 will be flashed. If the lever 28 is swung in a counterclockwise direction, as shown in FIG. 5, the left-hand lamps 14 and 16 will be flashed. By displacing the lever 28 along its longitudinal axis, as shown in FIG. 6, all of the lamps 14, 15, 16, 17, 18 and 19 may be flashed. In this case, the lever 28 is displaced axially by pulling out on the hand grip portion 30. However, the switch might easily be modified so that the lever 28 would be displaced axially by pushing inwardly on the hand grip portion 30.

In this case, the lever 28 extends radially from a hub 32 which is secured to a shaft 34. At one end, the shaft 34 is formed with a portion 36 which is rotatably mounted in a plate 38. To provide for longitudinal movement of the lever 28, the plate 38 is slidable in a housing 40. Thus, the housing 40 comprises opposite walls 42 and 44 which are formed with grooves 46 and 48 for slidably receiving the edges of the plate 38. Each of the grooves 46 and 48 may be formed between a pair of ridges or ribs 50 and 52.

To detain the lever 28 in its various positions, a detent disk or member 54 is secured to the shaft 34. It will be seen that the detent member 54 has three notches 56, 57 and 58 therein. These notches are adapted to be engaged by a detent ball 60 which is pressed against the member 54 by a coil spring 62. A housing 64 is mounted on the slidable plate 38 to hold the ball 60 and the spring 62 in their operating positions.

When the lever 28 is in its neutral or off position, the detent ball 60 engages the central notch 57. When the lever 28 is swung clockwise, as shown in FIG. 4, the ball 60 engages the notch 56. When the lever 28 is swung counterclockwise, the ball 60 engages the notch 58.

It will be seen that the control switch 12 has two fixed contacts 66 and 67 and a movable contact member 68. As shown, the movable contact member 68 is connected to the battery 20 through the switch 22 and the flasher 24. The connection to the movable contact member 68 may be made by means of a flexible lead 70. The fixed contact 66 may be connected to the left-hand lamps 14, 16 and 18, while the contact 67 may be connected to the right-hand lamps 15, 17 and 19.

In the illustrated construction, the fixed contacts 66 and 67 take the form of generally cylindrical posts which are mounted on an insulating plate 72. For convenience, the plate 72 may be securely mounted in the grooves 46 and 48. In this case, the movable contact member 68 is mounted on a stud or post 74 which is secured to or formed integrally with the lever 28. The stud 74 may be made of insulating material or may be insulated from the movable contact member 68 by a thin insulating sheet or layer 76.

In this case, the movable contact member 68 comprises a central arm portion 78 and a pair of laterally extending wing portions 80. The arm portion 78 extends generally in a radial direction from the shaft 34 and is adapted to be swung against the contact posts 66 and 67 when the operating lever 28 is swung to its right and left-hand positions, as shown in FIGS. 4 and 5. The wing portions 80 are curved or bow-shaped in form and are adapted to engage both the contact posts 66 and 67 when the lever 28 is displaced axially as shown in FIG. 6.

It is preferred to form the movable contact member 68 in one piece from a thin resilient metal strip, so that the contact member 68 will engage the contact posts 66 and 67 with a spring action. Thus, the arm portion 78 is U-shaped and is formed with a pair of legs 84 and 85, adapted to engage the contact posts 66 and 67, respectively. The legs 84 and 85 are offset away from each other to form channel portions 86 and 87 which embrace and grip the mounting stud 74 on the lever 28. It will be seen that the wing portions 80 extend laterally from the channel portions 86 and 87. The wing portions 80 are highly flexible and resilient so that they will engage the contact posts 66 and 67 with a spring action.

When the slidable plate is in its normal position, as shown in FIGS. 1 and 2, the lever 28 may be swung either clockwise or counterclockwise from its neutral or off position. However, an arrangement is provided to prevent the lever 28 from being swung in either direction when the lever 28 is displaced axially to actuate the emergency stop signal. Thus, the shaft 34 has an end portion 90 which extends through a keyhole-shaped opening 92, formed in one wall 94 of the casing 40. It will be seen that the end portion 90 of the shaft 34 has a pair of parallel flat sides 94. The keyhole slot 92 has an enlarged generally circular portion 96 in which the end portion 90 is free to rotate. It will be seen that the end portion 90 is disposed in the enlarged portion 96 when the lever 28 is in its normal position, as shown in FIGS. 1 and 2.

When the lever 28 is displaced axially, the end portion 90 enters a narrow generally rectangular portion 98 of the keyhole slot 92. In this portion 98 of the slot 92, the flat surfaces 94 are closely adjacent the edges of the slot portion 98, so that the shaft 34 is prevented from rotating. This will be clearly evident from FIG. 6.

The slidable plate 38 is adapted to be detained in its two positions of longitudinal movement, by means of a detent spring 100 which is engageable with a generally triangular cam-like projection 102 on the casing 40. The spring 100 is in the form of a thin resilient leaf or blade having an angularly formed end portion 104 which is engageable with the projection 102. To move the lever 28 between its two positions of axial displacement, it is necessary to overcome the force of the spring 100, so that the member 104 can be moved past the projection 102.

It may be helpful to summarize the operation of the signal system 10. When the lever 28 is swung in a clockwise direction, as shown in FIG. 4, the spring leg 85 of the contact member 68 engages the contact post 67. This completes a circuit to the lamps 15, 17 and 19, so that they will be flashed to indicate a right turn.

When the lever 28 is swung in a counterclockwise direction, as shown in FIG. 5, the spring leg 84 of the contact member 68 engages the contact post 66. This completes a circuit to the left-hand lamps 14, 16 and 18.

The lever 28 may be displaced axially by pulling outwardly on the grip portion 30 at the outer end of the lever. Such movement of the lever 28 will bring the resilient wings or blades 80 against both of the contact posts 66 and 67, as shown in FIG. 6. Thus, all of the lamps 14–19 will be flashed to serve as a warning for an emergency stop. When the lever 28 is thus displaced axially, it cannot be swung in either direction, because the non-circular end portion 90 of the shaft 34 is confined within the narrow portion 98 of the keyhole slot 92.

It will be apparent that the control switch 12 is very effective in operation and convenient to operate. Nevertheless, it is easy to manufacture and extremely low in cost.

It will be apparent that the control switch may be made to operate on an axial push of the lever, rather than an axial pull, simply by extending the operating lever in the opposite direction from the switch mechanism. FIG. 7 illustrates such a modified construction, comprising a control switch 12a having an actuated lever 28a which may be pushed inwardly along its longitudinal axis to operate the emergency stop signals. The modified switch 12a comprises contact posts 66a and 67a which are adapted to be engaged by a movable contact member 68a. The posts 66a and 67a are mounted on stationary insulating plates 72a. As before, the movable contact member 68a comprises a radial arm portion 78a. A pair of curved, bow-shaped wing portions 80a extend laterally from the arm portion 78a. As shown, the arm portion 78a is U-shaped. Thus, it comprises parallel spring legs 84a and 85a.

In this case, the lever 28a is mounted for swinging and sliding movement on a stationary pivot 110. The lever 28a has a widened inner portion 112 which is formed with a longitudinal slot 114, received over the pin 110. Thus, the lever 28a is swingable about the pin 110 and is slidable longitudinally.

The lever 28a has an insulating extension 116 on which the movable contact member 68a is mounted. The extension or arm 116 and the lever 28a extend in opposite directions from the pivot pin 110.

When the lever 28a is swung clockwise, the leg 85a of the contact member 68a engages the contact post 67a. This actuates the right-hand turn signal lamps.

When the lever 28a is swung counterclockwise, the leg 84a engages the contact post 66a so as to actuate the left-hand turn signal lamps. When the lever 28a is pushed inwardly along its longitudinal axis, the lateral wings 80a engage both of the posts 66a and 67a so as to actuate all of the lamps to provide the emergency stop signal. At the same time, the inner portion 112 of the lever 28a slides into a slot or opening 120 between the plates 72a. The slot 120 is wide enough to receive the member 112, but is so narrow as to prevent swinging movement of the lever 28a in either direction. The modified switch 12a may have detent arrangements, similar to those provided at FIG. 1, to detain the lever 28a in its various positions.

Various other modifications, alternative constructions and equivalents may be employed without departing from the true spirit and scope of the invention, as exemplified in the foregoing description and defined in the following claims.

I claim:

1. In a combination turn and emergency stop signal switch, the combination comprising a casing, a plate slidable in said casing, a shaft rotatably mounted on said plate, a lever secured to said shaft, a movable supply contact member connected to said lever, first and second turn signal contact posts mounted in said casing, said movable contact member having a radial portion and a pair of flexible resilient laterally extending wing portions, said lever being swingable in one direction to move said radial portion into engagement with said first post and being swingable in the opposite direction to move said radial portion into engagement with said second post, said lever and said plate being slidable along the longitudinal axis of said lever to move said wing portions into engagement with both of said contact posts, said shaft having a non-circular portion, said casing having a slot therein receiving said non-circular portion, said slot having a narrow portion for retaining said non-circular portion against rotation when said lever is shifted longitudinally to bring said wing portions into engagement with said posts, and detent means for detaining said lever when it is swung in either direction and when it is moved along its longitudinal axis.

2. In a combination turn and emergency stop signal switch, the combination comprising a casing, a member slidable in said casing, a shaft rotatably mounted on said member, a lever secured to said shaft, a movable supply contact element connected to said lever, first and second turn signal contact elements mounted in said casing, said movable contact element having a radial portion and a pair of flexible resilient laterally extending wing portions, said lever being swingable in one direction to move said radial portion into engagement with said first turn signal contact element and being swingable in the opposite direction to move said radial portion into engagement with said second turn signal contact element, said lever and said member being slidable longitudinally to move said wing portions into engagement with both of said turn signal contact elements, said shaft having a non-circular portion, said casing having a slot therein receiving said non-circular portion, said slot having a narrow portion for retaining said non-circular portion against rotation when said lever is shifted longitudinally to bring said wing portions into engagement with said turn signal contact elements, and detent means for detaining said lever when it is swung in either direction and when it is moved longitudinally.

3. In a combination turn and emergency stop signal switch, the combination comprising a casing, a member slidable in said casing, a lever swingably mounted on said member, a movable supply contactor connected to said lever, first and second turn signal contacts mounted in said casing, said movable contactor having a radial portion and a pair of flexible resilient laterally extending wing portions, said lever being swingable in one direction to move said radial portion into engagement with said first contact and being swingable in the opposite direction to move said radial portion into engagement with said second contact, said lever and said member being translatable to a stop signal position to move said wing portions into engagement with both of said contacts translated with said member, and means for positively preventing swinging movement of said lever in either direction when said lever is translated to said stop signal position.

4. In a combination turn and emergency stop signal switch, the combination comprising a casing, a member translatable in said casing, a shaft rotatably mounted on said member, a swingable lever secured to said shaft, a movable supply contactor connected to said lever, first and second turn signal contacts mounted in said casing, said contactor having means for engaging said first contact when said lever is swung in one direction and means for engaging said second contact when said lever is swung in the opposite direction, said lever and said member being translatable to a stop signal position for moving said movable contactor into engagement with both of said turn signal contacts, detent means for detaining said lever when it is swung in either direction and when it is translated with said member, and means for positively preventing swinging movement of said lever in either direction when said lever is translated with said member to said stop signal position.

5. In a combination turn and emergency stop signal switch, the combination comprising a casing, switch member translatable and swingable in said casing, a lever secured to said member, a movable supply contactor mounted on said member, first and second turn signal contacts mounted in said casing, said contactor having means for engaging said first contact when said member is swung in one direction and means for engaging said second contact when said member is swung in the opposite direction, said switch member being translatable to a stop signal position for moving said contactor into engagement with both of said turn signal contacts, detent means for detaining said switch member when it is swung in either direction and when it is translated to said stop signal position and means for positively preventing swinging movement of said switch member in either direction when said member is translated to said stop signal position.

References Cited in the file of this patent
UNITED STATES PATENTS

| | | |
|---|---|---|
| 1,716,373 | Ellis | June 11, 1929 |
| 1,893,371 | Knowlton | Jan. 3, 1933 |
| 2,667,603 | Hollins | Jan. 26, 1954 |
| 2,672,531 | Stevenson | Mar. 16, 1954 |
| 2,941,047 | Grashoff | June 14, 1960 |